(12) United States Patent
Nishio

(10) Patent No.: US 7,489,833 B2
(45) Date of Patent: Feb. 10, 2009

(54) TRANSMITTING DEVICE, RECONSTRUCTION DEVICE, TRANSMITTING METHOD AND RECONSTRUCTION METHOD FOR BROADCASTS WITH HIDDEN SUBTITLES

(75) Inventor: Toshiroh Nishio, Hirakata (JP)

(73) Assignee: Panasonic Corporation, Osaka (JP)

( * ) Notice: Subject to any disclaimer, the term of this patent is extended or adjusted under 35 U.S.C. 154(b) by 673 days.

(21) Appl. No.: 11/242,954

(22) Filed: Oct. 5, 2005

(65) Prior Publication Data

US 2006/0083301 A1 Apr. 20, 2006

(30) Foreign Application Priority Data

Oct. 6, 2004 (JP) ............................... 2004-293513

(51) Int. Cl.
*G06K 9/32* (2006.01)
(52) U.S. Cl. ..................... 382/293; 382/282; 382/284; 382/294
(58) Field of Classification Search ................ 382/275, 382/282, 284, 293, 294
See application file for complete search history.

(56) References Cited

U.S. PATENT DOCUMENTS 6,473,794 B1 * 10/2002 Guheen et al. ............... 709/223
6,640,304 B2 * 10/2003 Ginter et al. ................. 713/193
6,671,818 B1 * 12/2003 Mikurak ........................ 714/4
7,027,054 B1 * 4/2006 Cheiky et al. ................ 345/473
7,380,261 B2 * 5/2008 Gordon et al. ................. 725/41

FOREIGN PATENT DOCUMENTS

JP 2000-41185 2/2000

* cited by examiner

*Primary Examiner*—Yosef Kassa
(74) *Attorney, Agent, or Firm*—Wenderoth, Lind & Ponack, L.L.P.

(57) ABSTRACT

A transmitting device includes a main image generation unit generating a main image by overlaying first overlay data over an original image; an extraction unit extracting, from the original image, a partial image of a portion over which the first overlay data is overlaid; a first sub-image generation unit generating a first sub-image by overlaying second overlay data over the partial image; and encoding units and a multiplexing unit generating transmitted data by associating the main image and the first sub-image, and associating the main image with a broadcast time of the main image. Thus, the present invention provides a transmitting device, a reconstruction device, a transmitting method and a reconstruction method for broadcasts with hidden subtitles, having good operability for the viewer.

24 Claims, 14 Drawing Sheets

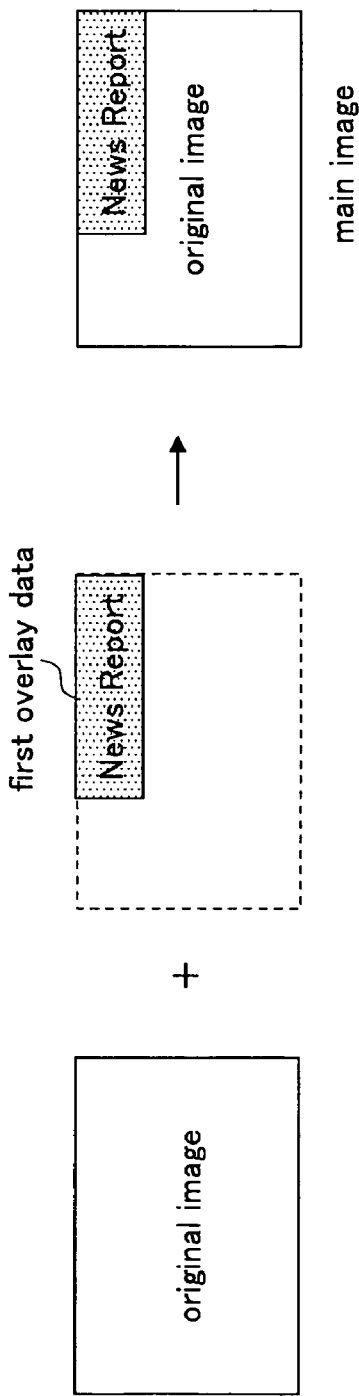
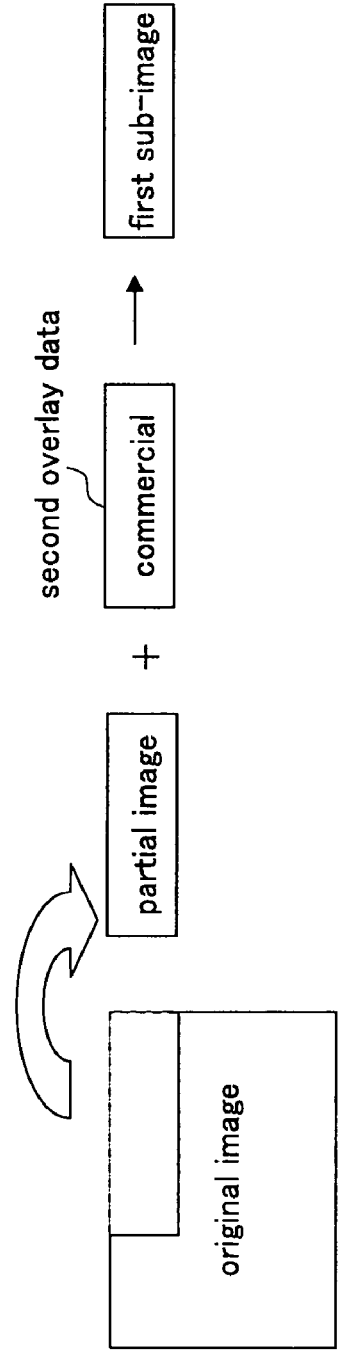
Fig. 1A
Fig. 1B

| Extension and user data | | |
|---|---|---|
| extension_and_user_data( i ) { | No. of bits | Mnemonic |
| while ( ( nextbits()== extension_start_code ) \|\| | | |
| ( nextbits()== user_data_start_code ) ) { | | |
| if ( ( i != 1 ) && ( nextbits()== extension_start_code ) | | |
| extension_data( i ) | | |
| if ( nextbits()== user_data_start_code ) | | |
| user_data() | | |
| } | | |
| } | | |

*Fig. 7*

User data

| user_data() { | No. of bits | Mnemonic |
|---|---|---|
| user_data_start_code | 32 | bslbf |
| while( nextbits() != '0000 0000 0000 0000 0000 0000 0000 0001' ) { | | |
| user_data | 8 | uimsbf |
| } | | |
| next_start_code() | | |
| } | | |

*Fig. 8*

| User data | | |
|---|---|---|
| user_data() { | No. of bits | Mnemonic |
| user_data_start_code | 32 | bslbf |
| while( nextbits() != '0000 0000 0000 0000 0000 0000 0000 0001' ) { | | |
| start_corner_horizontal | 16 | uimsbf |
| start_corner_vertical | 16 | uimsbf |
| size_of_horizontal | 16 | uimsbf |
| size_of_vertical | 16 | uimsbf |
| for ( i=0; i<size_of_horizontal * size_of_vertical; i++ ) { | | |
| G_data | 8 | uimsbf |
| B_data | 8 | uimsbf |
| R_data | 8 | uimsbf |
| } | | |
| } | | |
| next_start_code() | | |
| } | | |

※Meaning of the parameters

User_data

| user_data() { | No. of bits | Mnemonic |
|---|---|---|
| user_data_start_code | 32 | bslbf |
| while( nextbits() != '0000 0000 0000 0000 0000 0000 0000 0001' ) { | | |
| '0010' | 4 | bslbf |
| PTS [32..30] | 3 | bslbf |
| marker_bit | 1 | bslbf |
| PTS [29..15] | 15 | bslbf |
| marker_bit | 1 | bslbf |
| PTS [14..0] | 15 | bslbf |
| marker_bit | 1 | bslbf |
| start_corner_horizontal | 16 | uimsbf |
| start_corner_vertical | 16 | uimsbf |
| size_of_horizontal | 16 | uimsbf |
| size_of_vertical | 16 | |
| for ( i=0; i<size_of_horizontal * size_of_vertical; i++ ) { | | |
| G_data | 8 | uimsbf |
| B_data | 8 | uimsbf |
| R_data | 8 | uimsbf |
| } | | |
| } | | |
| next_start_code() | | |
| } | | |

*Fig. 10*

User data

| user_data() { | No. of bits | Mnemonic |
|---|---|---|
| user_data_start_code | 32 | bslbf |
| while( nextbits() != '0000 0000 0000 0000 0000 0001' ) { | | |
| '0010' | 4 | bslbf |
| PTS [32..30] | 3 | bslbf |
| marker_bit | 1 | bslbf |
| PTS [29..15] | 15 | bslbf |
| marker_bit | 1 | bslbf |
| PTS [14..0] | 15 | bslbf |
| marker_bit | 1 | bslbf |
| start_corner_horizontal | 16 | uimsbf |
| start_corner_vertical | 16 | uimsbf |
| size_of_horizontal | 16 | uimsbf |
| size_of_vertical | 16 | uimsbf |
| time_frame_1_start | 24 | uimsbf |
| time_frame_1_end | 24 | uimsbf |
| for ( i=0; i<size_of_horizontal * size_of_vertical; i++ ) { | | |
| G_data | 8 | uimsbf |
| B_data | 8 | uimsbf |
| R_data | 8 | uimsbf |
| } | | |
| time_frame_2_start | 24 | uimsbf |
| time_frame_2_end | 24 | uimsbf |
| for ( i=0; i<size_of_horizontal * size_of_vertical; i++ ) { | | |
| G_data | 8 | uimsbf |
| B_data | 8 | uimsbf |
| R_data | 8 | uimsbf |
| } | | |
| } | | |
| next_start_code() | | |
| } | | |

*Fig. 11*

TRANSMITTING DEVICE, RECONSTRUCTION DEVICE, TRANSMITTING METHOD AND RECONSTRUCTION METHOD FOR BROADCASTS WITH HIDDEN SUBTITLES

BACKGROUND OF THE INVENTION

1. Field of the Invention

The present invention relates to transmitting devices, reconstruction devices, transmitting methods and reconstruction methods for broadcasts with hidden subtitles.

2. Background Information

News reports about disasters or elections are typically broadcast with a subtitle image overlaid over an original image constituting the plain broadcast. This enables the viewer to obtain real-time information while viewing the program. However, there are cases in which a broadcast is temporarily recorded on a storage medium and viewed at a later time, so that the information that was useful at the time of the broadcast may not be useful anymore at the actual time of viewing.

JP 2000-41185A discloses a method for hiding unnecessary character information. FIG. 14 is a diagram illustrating the conventional character hiding method described in JP 2000-41185A. In FIG. 14, a partial image of the image corresponding to the character portion before the characters have been inserted is sent as a part of the transmitted bit string and overlayed on the receiving side. A code classification unit 1 separates the received signal into a main image over which the subtitles are overlaid and the partial image from before the subtitles have been overlaid, and outputs these images to a main image decoding unit 3 and a sub-image decoding unit 5. The main image decoding unit 3 and the sub-image decoding unit 5 decode the main image and the sub-image, respectively. Moreover, an operation unit 9 is operated by the viewer, and the viewer's operation is output from the operation unit 9 to a control unit 7. A superimposing unit 11 outputs an image based on a main image and a sub-image, in accordance with an instruction from the control unit 7. In this situation, if the viewer has entered an operation for outputting a main image, then the main image is output. If, on the other hand, the viewer has entered an operation for outputting the original image, then the main image and the sub-image are combined, and an image in which the subtitle portion has been overwritten is output.

With the configuration of JP 2000-41185A, in situations in which the reconstruction is performed after a temporary recording, if a digital recording is made, then it can be selected whether subtitles should appear or not appear during the reconstruction. However, in this case, the viewer needs to select one of those manually. That is to say, when reconstruction after temporarily storing, the viewer needs to explicitly know the current time, compare the current time with the time the content has been broadcast, and to manually set whether subtitles should be displayed or not. Moreover, the viewer cannot be aware of information with a time limit, such as information about a campaign with a time limit, so that it is difficult to turn the display of the information with the time limit on or off as intended by the broadcaster. Furthermore, recent storage media, such as DVD players, can store large amounts of data, and switching the display of subtitles for such large amounts of stored data on or off every time means poor operability for the viewer.

In view of the above, there exists a need for transmitting devices, reconstruction devices, transmitting methods and reconstruction methods for broadcasts with hidden subtitles which overcome the above mentioned problems in the prior art and which have good operability for the user. This invention addresses this need in the prior art as well as other needs, which will become apparent to those skilled in the art from this disclosure.

SUMMARY OF THE INVENTION

In order to solve the above-noted problems, a transmitting device according to a first aspect of the present invention includes a main image generation unit operable to generating a main image by overlaying first overlay data over an original image; an extraction unit operable to extracting, from the original image, an image (referred to as "partial image" below) of a portion over which the first overlay data is overlaid; a sub-image generation unit operable to generating a first sub-image by overlaying second overlay data over the partial image; a transmitted data generation unit operable to generating transmitted data by associating the main image and the first sub-image, and associating the main image with a broadcast time of the main image.

The first overlay data may be inserted data, such as subtitles, that is directly linked to the broadcast time, such as a news report, earthquake information or a weather report. On the other hand, the second overlay data may be insertion data for which there is some leeway regarding the time period during which it can be broadcast, such as a commercial, or insertion data that has no valid period for being broadcast and that can be reconstructed at any time. Moreover, the transmitting device may be a broadcasting station, for example, which generates a main image and a first sub-image by overlaying first and second overlay data respectively over an original image and a partial image, and transmitting it to a reconstruction device on the user side. The reconstruction device reconstructs the main image and the first sub-image received from the transmitting device, and if the user cannot immediately view the images, then it temporarily stores them. If the time at which the user of the reconstruction device views the images (referred to as "current time" below) is about the same as the broadcast time, then the reconstruction device reconstructs the main image. On the other hand, if the current time is not about the same as the broadcast time, then the reconstruction device reconstructs an image obtained by overlaying the first sub-image over the main image (referred to as "first overlaid image" below). That is to say, the portion of the main image over which the first overlay data is overlaid is covered by the first sub-image. Thus, the user can enjoy viewing the images without being bothered by information that has become stale in the time that has passed after the broadcast time. Moreover, since the switching between the first overlay data and the second overlay data is performed automatically by the reconstruction device, the user can enjoy the video or audio corresponding to the current time without having to perform any special operation.

According to a second aspect of the present invention, in the transmitting device according to the first aspect, the sub-image generation unit further generates a second sub-image by overlaying third overlay data over the partial image; and the transmitted data generation unit generates the transmitted data by further associating the main image with the second sub-image, associating the first sub-image with first time limit information indicating a period during which the first sub-image can be reconstructed, and associating the second sub-image with second time limit information indicating a period during which the second sub-image can be reconstructed.

The transmitting device generates transmitted data including not only the main image, but also the first sub-image and the second sub-image to which time limit information is attached. The reconstruction device compares the current time and the broadcast time of the main image, and reconstructs the main image, if the current time is the same as the broadcast time. On the other hand, if the current time is different from the broadcast time, then it compares the current time with the first time limit information and the second time limit information. Then, if the current time is within the valid period indicated by the first time limit information, then the reconstruction device reconstructs an image obtained by overlaying the first sub-image over the main image. On the other hand, if the current time is within the valid period indicated by the second time limit information, then the reconstruction device reconstructs an image obtained by overlaying the second sub-image over the main image (referred to as "second overlaid image" in the following). Thus, since it is possible to switch the images in accordance with the current time, the user can enjoy viewing the image in accordance with the current time. Moreover, the user himself can enjoy the video or audio corresponding to the current time without having to perform any special operation in order to switch the image.

According to a third aspect of the present invention, in the transmitting device according to the first aspect, the transmitted data generation unit generates the transmitted data by further associating the main image with the partial image.

The transmitted data includes the main image and its broadcast time; the first sub-image and its first time limit information; the second sub-image and its second time limit information; and the partial image. For example, if the current time is after the broadcast time and is not within the first time limit information or the second time limit information, then the reconstruction device may reconstruct an image obtained by overlaying the partial image over the main image. The partial image is an image obtained by cutting the overlay region where the first overlay data has been overlaid from the original image, and is an image without overlay data, such as subtitles. Thus, by overlaying the partial image over the main image, the user can view the original image without being bothered by first overlay data that has become stale in the time that has passed after the broadcast time.

According to a fourth aspect of the present invention, in the transmitting device according to the first aspect, the transmitted data generation unit generates the transmitted data by further associating the first sub-image with coordinate information of the partial image in the original image.

The coordinate information indicates the position of the partial image in the original image, and by overlaying the first sub-image over the main image in accordance with this coordinate information, it is possible to completely hide the first overlay data of the main image. Thus, the user can enjoy viewing the image without being bothered by first overlay data that has become stale in the time that has passed after the broadcast time.

According to a fifth aspect of the present invention, in the transmitting device according to the first aspect, the transmitted data generation unit attaches a time stamp or a packet ID to the packets constituting the main image and the first sub-image, so that the main image and the first sub-image can be associated with each other.

For example, the broadcast time of the main image may be written into the timestamp of the main image, and the broadcast time of the corresponding main image may be written into the timestamp of the first sub-image. In this case, it is possible to associate the main image and the first sub-image through the broadcast time. It should be noted that associating the main image and the first sub-image using the timestamp is not limited to the broadcast time, and it is also possible to use other time information. Moreover, it is also possible to associate the main image and the first sub-image by attaching a packet ID to each packet of the main image and attaching the packet ID of the corresponding main image to the packets of the first sub-image. By thus associating the main image and the related first sub-image, the reconstruction device can accurately overlay the main image and the corresponding first sub-image.

According to a sixth aspect of the present invention, in the transmitting device according to the fifth aspect, the time stamp or the packet ID is, respectively, a PTS (presentation time stamp) or a PID (packet identifier) in accordance with the ISO/IEC13818-1 standard. By using the PTS or the PID of the existing ISO/IEC 13818-1 Standard, it is possible to associate the main image and the first sub-image.

According to a seventh aspect of the present invention, in the transmitting device according to the first aspect, the transmitted data generation unit generates the transmitted data by writing the first sub-image corresponding to the main image into a region that belongs to the main image and into which any data can be written. The transmitting device generates transmitted data by writing a corresponding first sub-image into a suitable region belonging to the main image. Thus, by reconstruction the first sub-image that is written into the suitable region belonging to the main image together with the main image, the reconstruction device can overlay the first sub-image over the main image.

According to an eighth aspect of the present invention, in the transmitting device according to the seventh aspect, the region belonging to the main image into which any data can be written is a user data region according to the ISO/IEC13818-2 standard; and the transmitted data generation unit generates the transmitted data by converting the first sub-image into a user data format in accordance with the ISO/IEC13818-2 standard, and writing the first sub-image, which has been converted into the user data format, into the user data region belonging to the main image. By using the user data of the existing ISO/IEC 13818-2 Standard, it is possible to associate the main image and the first sub-image.

According to a ninth aspect of the present invention, in the transmitting device according to the eighth aspect, the first sub-image, which has been converted into the user data format, is arranged in the user data region of a picture unit of the corresponding main image.

Since the first sub-image is disposed in a user data region of picture units of the main image, that is, of frame units of the main image, the association of the main image and the first sub-image can be performed reliably. Moreover, when the main image in the reconstruction device is selected, it becomes possible to obtain, at the same time, the first sub-image corresponding to this main image. Thus, it is possible to prevent that, when the main image is edited, the first sub-image is lost, for example because the main image and the first sub-image are edited separately.

According to a tenth aspect of the present invention, the transmitting device according to the first aspect further comprises an address obtaining unit operable to obtaining an address on the WWW (world wide web) where a second sub-image obtained by overlaying third overlay data over the partial image is stored; and the transmitted data generation unit generates transmitted data by further associating the main image with the address of the second sub-image and associating the first sub-image with first time limit information on a time limit during which the first sub-image can be reconstructed.

The second sub-image may be stored on the WWW, and the transmitting device may transmit to the reconstruction device the address where the second sub-image is stored, without transmitting the second sub-image itself. The reconstruction device can obtain the second sub-image by accessing this address. Thus, the reconstruction device reconstructs the main image, the first overlaid image or the second overlaid image, in accordance with the result of comparing the current time with the broadcast time. That is to say, the reconstruction device outputs the main image if the current time is the same as the broadcast time, outputs the first overlaid image if the current time is within the first time limit information, and outputs an image obtained by overlaying the second sub-image over the main image if the current time is neither the same as the broadcast time nor within the first time limit information.

According to an eleventh aspect of the present invention, a transmitting device comprises a main image generation unit operable to generating a main image by overlaying first overlay data over an original image; an address obtaining unit operable to obtaining an address on the WWW (world wide web) where a first sub-image obtained by overlaying second overlay data over a partial image corresponding to an overlay region with first overlay data extracted from the original image is stored; and a transmitted data generation unit operable to generating transmitted data by associating the main image with the address of the first sub-image and associating the main image with a broadcast time of the main image.

The first sub-image may be stored on the WWW, and the transmitting device may transmit the address where the first sub-image is stored to the reconstruction device without transmitting the first sub-image itself. The reconstruction device can obtain the first sub-image by accessing this address. Then, the reconstruction device generates the main image or the first overlaid image, depending on the result of comparing the current time with the broadcast time, as in the first aspect of the present invention.

According to a twelfth aspect of the present invention, a reconstruction device reconstruction transmitted data generated by associating a main image obtained by overlaying first overlay data over an original image with a first sub-image obtained by overlaying second overlay data over an image (referred to as "partial image" below) of a portion that is extracted from the original image and over that the first overlay data is overlaid, and associating the main image and a broadcast time of the main image, comprises a comparison unit operable to comparing a current time with the broadcast time of the main image; and an output unit operable to outputting the main image or an image (referred to as "first overlaid image" below) obtained by overlaying the first sub-image over the main image, in accordance with a result of the comparison with the comparison unit. This attains the same operational effect as in the first aspect of the present invention.

According to a thirteenth aspect of the present invention, in the twelfth aspect of the present invention, the transmitted data is generated by associating the main image with a second sub-image obtained by overlaying third overlay data over the partial image, associating the first sub-image with first time limit information on a time limit during which the first sub-image can be reconstructed, and associating the second sub-image with second time limit information on a time limit during which the second sub-image can be reconstructed; the comparison mean compares the current time with the broadcast time, the first time limit information and the second time limit information; and the output unit outputs the main image, the first overlaid image, or an image (referred to as "second overlaid image" below) obtained by overlaying the second sub-image over the main image in accordance with the result of the comparison with the comparison unit. This attains the same operational effect as in the second aspect of the present invention.

According to a fourteenth aspect of the present invention, in the twelfth aspect of the present invention, the transmitted data is generated by further associating the main image with the partial image; and the output unit outputs the main image, the first overlaid image or an image (referred to as "partial overlaid image" below) obtained by overlaying the partial image over the main image, in accordance with the result of the comparison with the comparison unit. This attains the same operational effect as in the third aspect of the present invention.

According to a fifteenth aspect of the present invention, in the twelfth aspect of the present invention, the transmitted data is generated by associating the first sub-image with coordinate information of the partial image in the original image. This attains the same operational effect as in the fourth aspect of the present invention.

According to a sixteenth aspect of the present invention, in the twelfth aspect of the present invention, the transmitted data has a time stamp or a packet ID attached to the packets constituting the main image and the first sub-image, so that the main image and the first sub-image can be associated with each other. This attains the same operational effect as in the fifth aspect of the present invention.

According to a seventeenth aspect of the present invention, in the sixteenth aspect of the present invention, the time stamp or the packet ID is, respectively, a PTS (presentation time stamp) or a PID (packet identifier) in accordance with the ISO/IEC13818-1 standard. This attains the same operational effect as in the sixth aspect of the present invention.

According to an eighteenth aspect of the present invention, in the twelfth aspect of the present invention, in the transmitted data, the first sub-image corresponding to the main image is arranged in a region that belongs to the main image and into which any data can be written. This attains the same operational effect as in the seventh aspect of the present invention.

According to a nineteenth aspect of the present invention, in the eighteenth aspect of the present invention, the region belonging to the main image into which any data can be written is a user data region according to the ISO/IEC13818-2 standard; and the transmitted data is generated by writing the first sub-image, which has been converted into a user data format in accordance with the ISO/IEC13818-2 standard, into the user data region belonging to the main image. This attains the same operational effect as in the eighth aspect of the present invention.

According to a twentieth aspect of the present invention, in the nineteenth aspect of the present invention, the first sub-image, which has been converted into the user data format, is arranged in the user data region of a picture unit of the corresponding main image. This attains the same operational effect as in the ninth aspect of the present invention.

According to a twenty-first aspect of the present invention, in the twelfth aspect of the present invention, the transmitted data is generated by associating the main image with an address on the WWW where a second sub-image obtained by overlaying third overlay data over the partial image is stored, and associating the first sub-image with first time limit information on a time limit during which the first sub-image can be reconstructed; the comparison unit compares the current time with the broadcast time, the first time limit information and the second time limit information; the reconstruction device further comprises an image obtaining unit operable to obtaining the first sub-image by accessing the address of the second sub-image based on the result of the comparison with the comparison unit; and the output unit outputs the main image or the first overlaid image obtained by overlaying the first sub-image obtained with the image obtaining unit over the main image. This attains the same operational effect as in the tenth aspect of the present invention.

According to a twenty-second aspect of the present invention, a reconstruction device reconstruction transmitted data generated by associating a main image obtained by overlaying first overlay data over an original image with an address on the WWW where a first sub-image obtained by overlaying second overlay data over an image (referred to as "partial image" in the following) that is extracted from the original image and over that the first overlay data is overlaid, and associating the main image and a broadcast time of the main image, comprises a comparison unit operable to comparing a current time with the broadcast time of the main image; an image obtaining unit operable to obtaining the first sub-image by accessing the address of the first sub-image based on the result of the comparison with the comparison unit; and an output unit operable to outputting the main image or the first overlaid image obtained by overlaying the first sub-image obtained with the image obtaining unit over the main image, in accordance with a result of the comparison with the comparison unit. This attains the same operational effect as in the eleventh aspect of the present invention.

According to a twenty-third aspect of the present invention, a transmitting method comprises a main image generating step of generating a main image by overlaying first overlay data over an original image; an extraction step of extracting, from the original image, an image (referred to as "partial image" below) of a portion over which the first overlay data is overlaid is stored; a sub-image generating step of generating a first sub-image by overlaying second overlay data over the partial image; a transmitted data generating step of generating transmitted data by associating the main image and the first sub-image, and associating the main image with a broadcast time of the main image. This attains the same operational effect as in the first aspect of the present invention.

According to a twenty-fourth aspect of the present invention, a reconstruction method for reconstruction transmitted data generated by associating a main image obtained by overlaying first overlay data over an original image with a first sub-image obtained by overlaying second overlay data over an image (referred to as "partial image" below) of a portion that is extracted from the original image and over that the first overlay data is overlaid, and associating the main image and a broadcast time of the main image, comprises a comparison step of comparing a current time with the broadcast time of the main image; and an output step of outputting the main image or a first overlaid image obtained by overlaying the first sub-image over the main image, in accordance with a result of the comparison in the comparison step. This attains the same operational effect as in the twelfth aspect of the present invention.

With the present invention, a transmitting device, a reconstruction device, a transmitting method and a reconstruction method for broadcasts with hidden subtitles, with good operability for the user can be provided.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 1(a) is a diagram illustrating a main image in accordance with the present invention.

FIG. 1(b) is a diagram illustrating a first sub-image in accordance with the present invention.

FIG. 7 is a diagram illustrating extension_and_user_data.

FIG. 8 is a diagram illustrating user_data.

FIG. 10 is a content example (2) of user_data.

FIG. 11 is a content example (3) of user_data.

DETAILED DESCRIPTION OF THE PREFERRED EMBODIMENTS

Overview of the Invention

A transmitting device of a broadcasting station or the like transmits transmitted data including video and audio or the like to a reconstruction device on the user side. By reconstruction the transmitted data with the reconstruction device, the user can enjoy the broadcast program. If the user does not use the transmitted data right away, the reconstruction device may temporarily store the transmitted data.

FIG. 1 is a diagram illustrating the transmitted data that is generated by a transmitting device according to the present invention. As shown in FIG. 1(a), the transmitting device generates a main image by overlaying first overlay data over an original image. Here, "original image" means an image over which no overlay data, such as subtitles, has been overlaid. An example of the first overlay data is inserted data, such as subtitles, which are directly connected to the broadcast time, such as for a news report, election information, earthquake information or a weather report. Moreover, as shown in FIG. 1(b), the transmitting device extracts a partial image corresponding to the first overlay data from the original image, and generates a first sub-image by overlaying second overlay data that is different from the first overlay data over the partial image. The second overlay data can be insertion data having a certain time period during which it can be broadcast, such as a commercial, or insertion data having no valid period for being broadcast. The transmitting device transmits the transmitted data including the generated main image, the broadcast time of the main image and the first sub-image to the reconstruction device. For this, the transmitting device associates the main image with the first sub-image, and also associates the main image with its broadcast time, before transmitting them to the reconstruction device. Here, it is assumed that the broadcast time is 19:00 on 2005.6.10.

Figure 2:
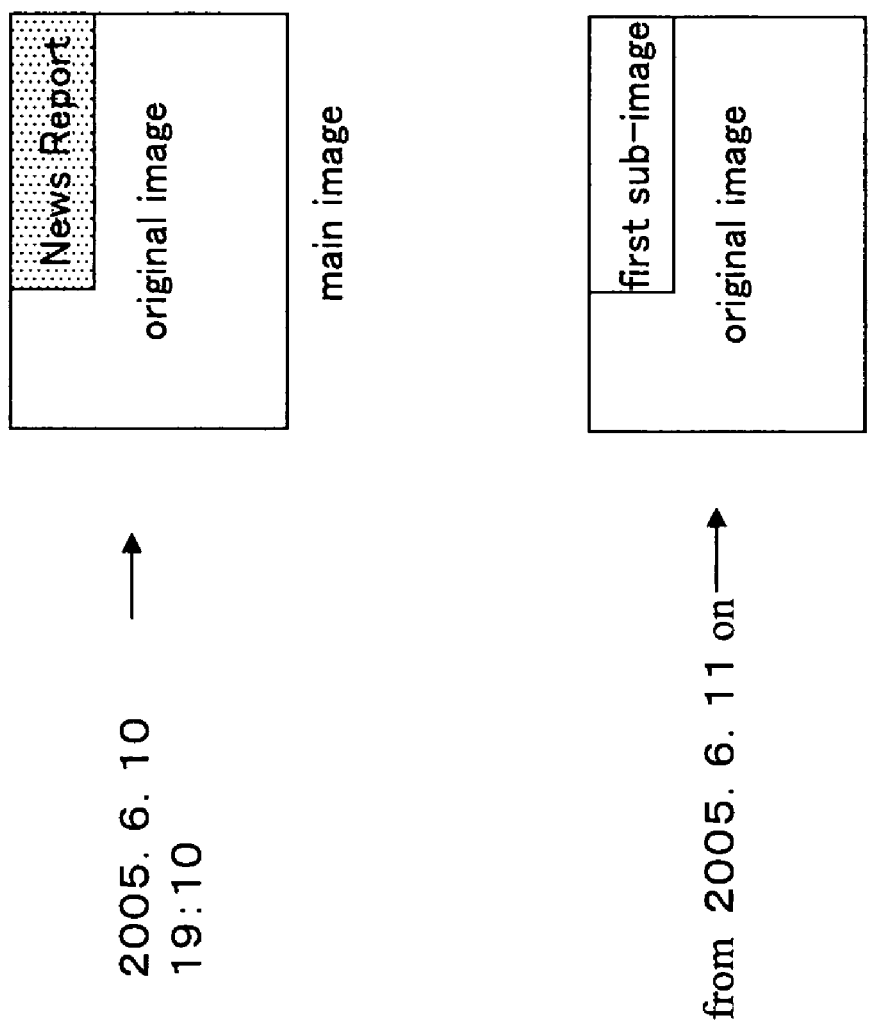
FIG. 2 is a diagram showing the reconstruction data that is reconstructed by the reconstruction device.

FIG. 2 is a diagram showing the reconstruction data that is reconstructed by the reconstruction device. The reconstruction device obtains the current time and compares the current time with the broadcast time. Based on the result of this comparison, the main image is reconstructed or an image obtained by overlaying the first sub-image over the main image (referred to as "first overlaid image") is reconstructed. More specifically, as shown in FIG. 2, the reconstruction device first obtains the current time, namely 19:00 on 2005.6.10, and compares it with the broadcast time 19:00 on 2005.6.10. When the reconstruction device judges that the difference between the current time and the broadcast time is small, then it reconstructs the main image. On the other hand, if the current time is for example 15:00 on 2005.6.12, then it judges that the difference between the current time and the broadcast time is large and reconstructs the first sub-image overlaid over the main image.

It should be noted that the transmitting device may also be devised such that it includes, in the transmitted data sent to the reconstruction device, a valid period during which the main image can be reconstructed, in addition to the broadcast time of the main image to be viewed in real-time. Alternatively, the reconstruction device may be devised such that it is provided in advance with information regarding a valid period during which the main image can be reconstructed. Thus, the judgment by the reconstruction device whether to reconstruct the main image or the first overlaid image is based on whether the current time is within the valid period or not.

In this manner, the unit of the main image over which the first overlay data is overlaid may be covered by the first sub-image, depending on the result of comparing the current time with the broadcast time. Thus, the user can view the broadcast without being bothered by information that has become stale because a long time has passed after the broadcast. Moreover, the switching between the first overlay data and the second overlay data is performed automatically by the reconstruction device, so that the user can focus on the video and the audio corresponding to the current time, without performing an operation for viewing in accordance with the current time.

FIRST WORKING EXAMPLE

Figure 3:
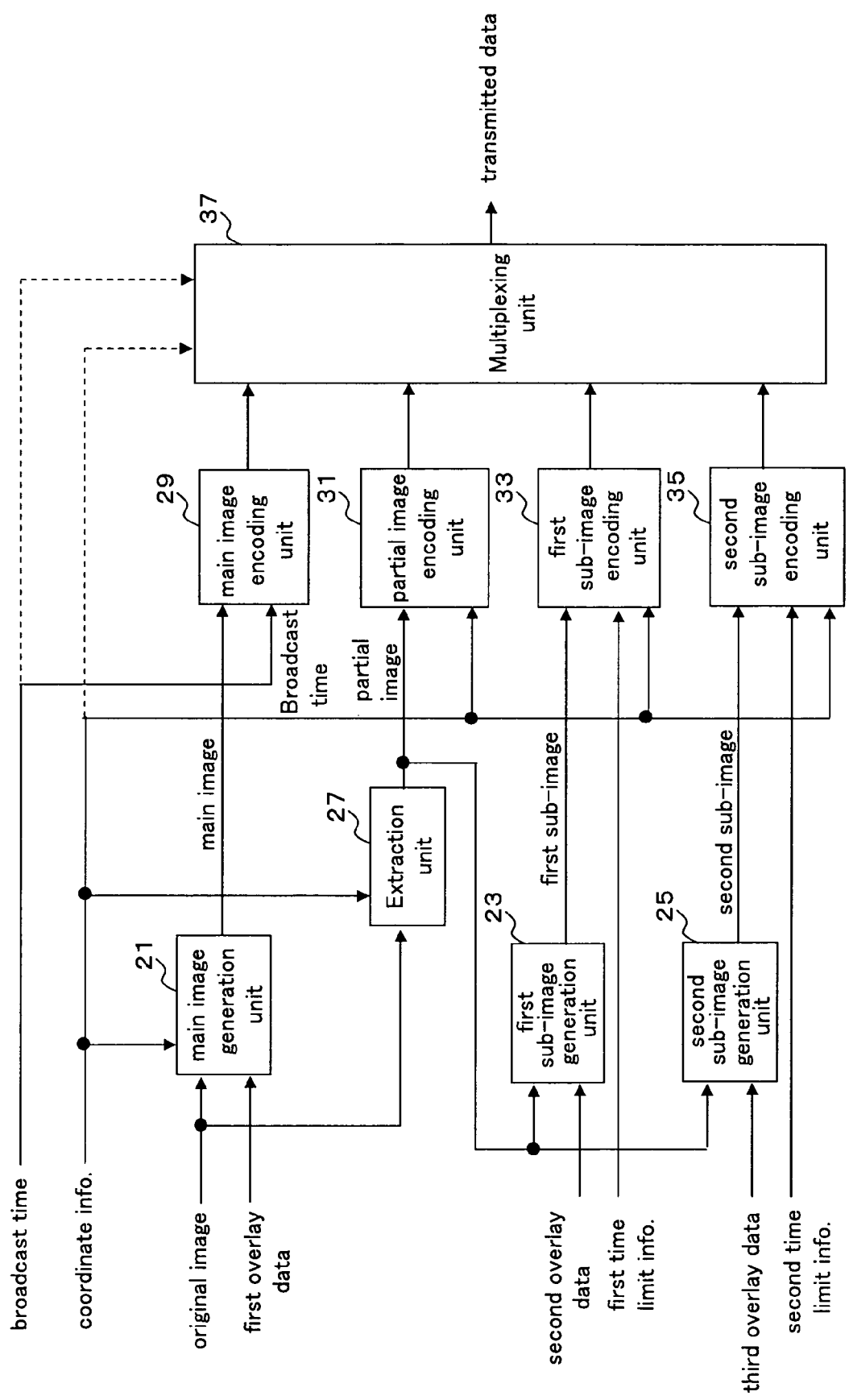
FIG. 3 is a block diagram showing the functional configuration of a transmitting device according to the present invention.
Figure 5:
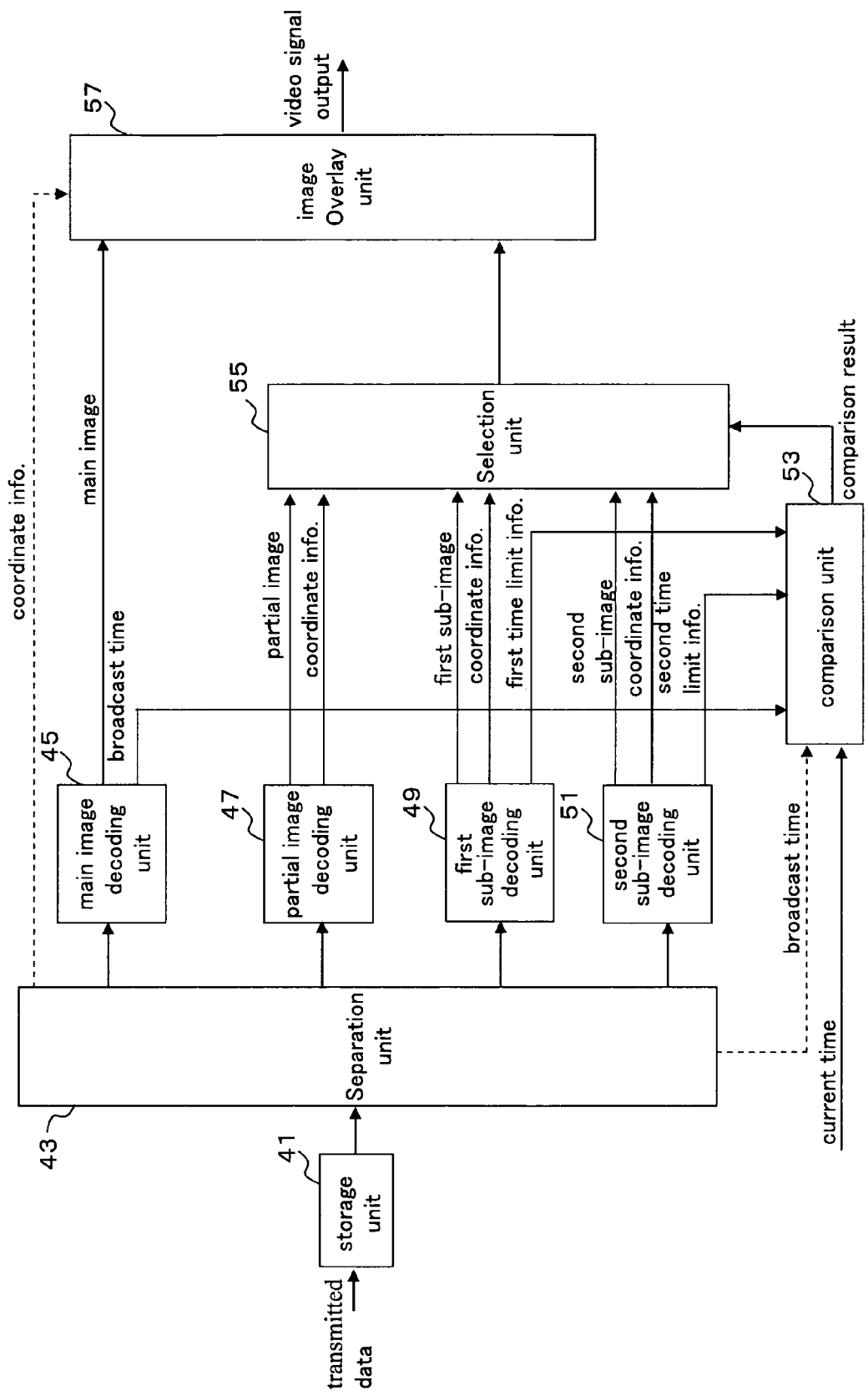
FIG. 5 is a block diagram showing the functional configuration of the reconstruction device of the present invention.

A system for broadcasts with hidden subtitles according to a first working example includes a transmitting device as shown in FIG. 3 and a reconstruction device as shown in FIG. 5.

(1) Functional Configuration of the Transmitting Device

FIG. 3 is a block diagram showing the functional configuration of a transmitting device according to the present invention. Based on coordinate information, a main image generation unit 21 generates a main image in which first overlay data has been overlaid over an original image. This coordinate information is information indicating the position of the first overlay data within the overlaid original image, and is the coordinates of a partial image described later. Based on the coordinate information, an extraction unit 27 extracts the image of the portion over which the first overlay data has been overlaid (referred to as "partial image" in the following) from the original image. A first sub-image generation unit 23 generates a first sub-image by overlaying second overlay data over the partial image extracted by the extraction unit 27. Similarly, a second sub-image generation unit 25 generates a second sub-image by overlaying third overlay data over the partial image. Here, the first to third overlay data is inserted data, such as subtitles, as mentioned above, and is for alerting the user to various kinds of information by overlaying it over the original image.

A main image encoding unit 29 associates the main image and the broadcast time of the main image and encodes them, and outputs them to a multiplexing unit 37. The main image encoding unit 29 subjects the image to highly efficient compression encoding, such as that of the MPEG2 video standard (ISO/IEC13818-2). A partial image encoding unit 31 associates the partial image and the coordinate information and encodes them, and outputs them to the multiplexing unit 37. Similarly, the first sub-image encoding unit 33 associates the first sub-image, the coordinate information and first time limit information and encodes them and outputs them to the multiplexing unit 37. And the second sub-image encoding unit 35 associates the second sub-image and the coordinate information second time limit information and encodes them and outputs them to the multiplexing unit 37.

Here, the first time limit information is a time limit until which the first sub-image can be reconstructed by the reconstruction device reconstruction the transmitted data. Similarly, the second time limit information is a time limit until which the second sub-image can be reconstructed by the reconstruction device. For example, let us assume that the second overlay data within the first sub-image is data relating to a prize with a time limit, and that there is a certain period within which it is possible to apply for the prize. The time within which it is possible to apply for the prize corresponds to the first time limit information. If the time at which the user attempts to view the main image with the reconstruction device (referred to as "current time" in the following) is within the valid period indicated by the first time limit information, then it is possible to reconstruct the first sub-image. On the other hand, if the current time has exceeded the valid period indicated by the first time limit information, then the reconstruction device does not reconstruct the first sub-image. The specifics of this valid period and the first to third overlay data are set on the side of the transmitting device at the time of the broadcast. For example, the first overlay data may be set to the character string "Live Broadcast", the second overlay data to "Today's News" and the third overlay data to "This Week's News", and the first time limit information may be set to one minute up to one day, and the second time limit information may be set to one day up to seven days.

The multiplexing unit 37 receives the encoded data of the main image and the broadcast time of the main image from the main image encoding unit 29, receives the encoded data of the coordinate information and the partial image from the partial image encoding unit 31, receives the encoded data of the coordinate information, the first time limit information and the first sub-image from the first sub-image encoding unit 33, and receives the encoded data of the coordinate information, the second time limit information and the second sub-image from the second sub-image encoding unit 35. Then, the multiplexing unit 37 multiplexes the received encoded data with each other, thus generating transmitted data. That is to say, the multiplexing unit 37 multiplexes the encoded data by associating the partial image, the first sub-image and the second sub-image with the main image, associating the main image with its broadcast time, associating the first sub-image with the first time limit information and the coordinate information and associating the second sub-image with the second time limit information and the coordinate information. It should be noted that, as indicated by the dotted lines in FIG. 3, the broadcast time of the main image and the coordinate information may be directly input into the multiplexing unit 37, and the multiplexing unit 37 may generate the transmitted data by multiplexing the output from the various encoding portions, the broadcast time of the main image and the coordinate information.

The associating of these various kinds of information can be achieved by attaching a time stamp or a packet ID to the packets constituting the main image, the partial image, the first sub-image and the second sub-image. More specifically, the broadcast time of the main image is written into the time stamp of the main image, and the broadcast time of the corresponding main image is also written into the time stamp of the partial image, the first sub-image and the second sub-image. Thus, it is possible to associate the main image with the partial image, the first sub-image and the second sub-image through the broadcast time. It should be noted that the association of the main image and the partial image and sub-images is not limited to using the time stamp, and may also be achieved through other time information. Furthermore, it is also possible to associate the main image with the partial image, the first sub-image and the second sub-image through packet IDs, by attaching a packet ID to each packet of the main image, and attaching the corresponding packet ID of the main image to the packets of the partial image, the first sub-image and the second sub-image. By associating the main image with the related first sub-image, the reconstruction device can reliably overlay the main image and the corresponding first sub-image.

For the above-noted time stamp or packet ID, it is possible to use the PTS (presentation time stamp) or the PID (packet identifier) defined in the ISO/IEC13818-1 standard. The transmitted data generated with the multiplexing unit 37 is a transport stream as defined for example by the MPEG2 system (ISO/IEC13818-1), and if each encoded bit string of the transmitted data is taken to be constituted by PES packets as defined by the MPEG2 system, then each picture is given a PTS, and it is possible to synchronize the display time of the main image and the other images. Thus, it is possible to associate the main image with the first sub-image, using the existing PTS or PID according to the ISO/IEC 13818-1 Standard.

(2) Overview of the Processing of the Transmitting Device

Figure 4:
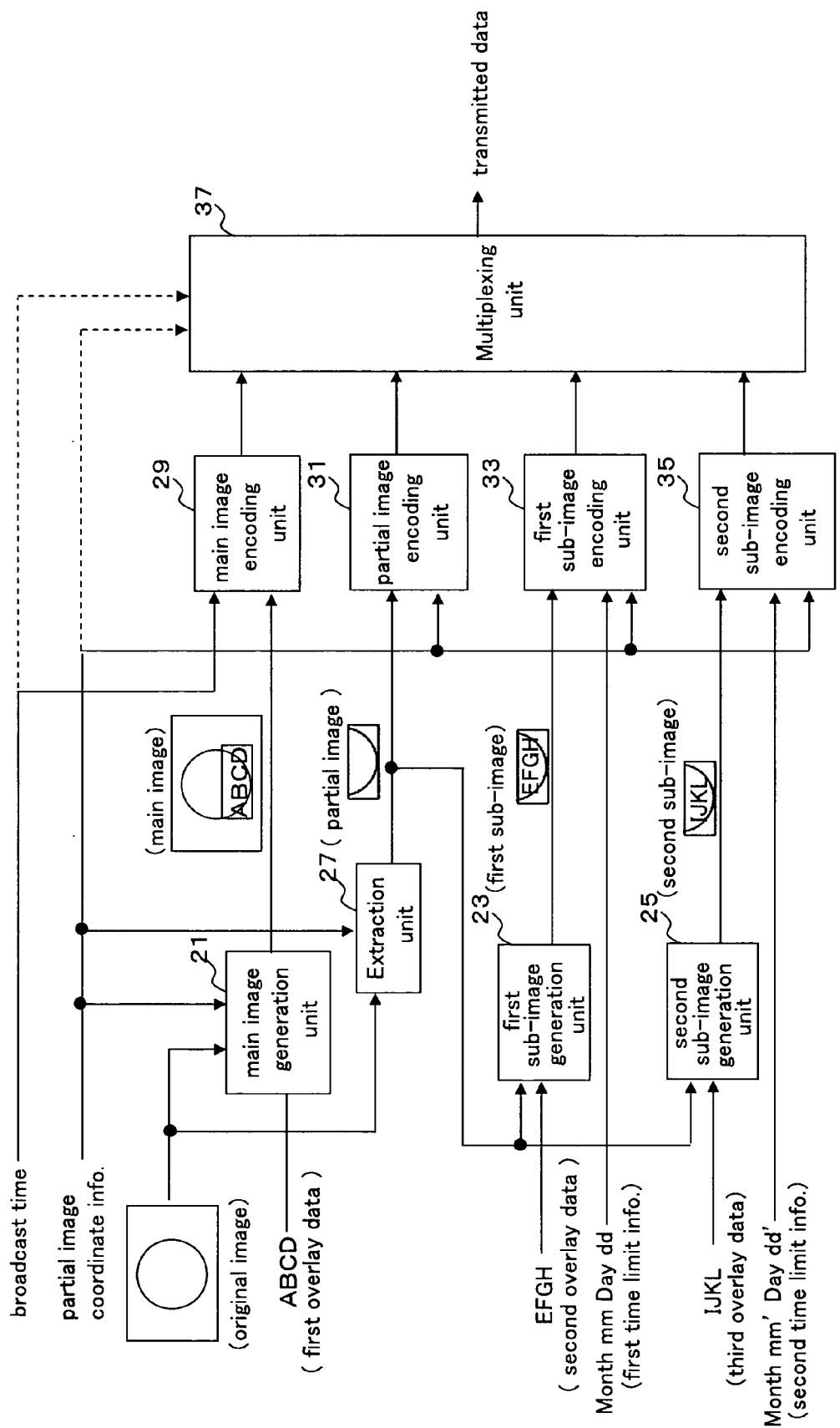
FIG. 4 is a diagram showing an overview of the processing of the transmitting device.

FIG. 4 is a diagram showing an overview of the processing of the transmitting device. The main image generation unit 21 generates a main image by overlaying the first overlay data "ABCD" over the original image, in accordance with the coordinate information. And based on the coordinate information, the extraction unit 27 extracts the original image of the portion where the first overlay data "ABCD" is overlaid. Furthermore, the first sub-image generation unit 23 generates a first sub-image by overlaying the second overlay data "EFGH" over the partial image. Similarly, the second sub-image generation unit 25 generates a second sub-image by overlaying the third overlay data "IJKL" over the partial image.

Next, the main image encoding unit 29 associates the main image over which the first overlay data "ABCD" is overlaid with the broadcast time and encodes them. The first sub-image encoding unit 33 associates the first sub-image obtained by overlaying the second overlay data "EFGH" with the first time limit information "Month mm Day dd" and the coordinate information and encodes them. Similarly, the second sub-image encoding unit 35 associates the second sub-image obtained by overlaying the third overlay data "IJKL" with the second time limit information "Month mm' Day dd'" and the coordinate information and encodes them. The multiplexing unit 37 multiplexes the encoded data and outputs it as transmitted data.

(3) Functional Configuration of the Reconstruction Device

FIG. 5 is a block diagram showing the functional configuration of the reconstruction device of the present invention. When a storage unit 41, which may be for example a hard disk, receives transmitted data from the transmitting device, it temporarily stores the transmitted data or stores it until reconstruction begins. A separation unit 43 receives the transmitted data from the storage unit 41, and separates the transmitted data into the main image and its broadcast time; the partial image and its coordinate information; the first sub-image, its coordinate information and the first time limit information; and the second sub-image, its coordinate information and the second time limit information, and outputs this data to the various decoding portions.

A main image decoding unit 45 receives the main image and its broadcast time, decodes these, and outputs the main image to an image overlay unit 57. A partial image decoding unit 47 decodes the partial image and the coordinate information, and outputs these to a selection unit 55. A first sub-image decoding unit 49 decodes the first sub-image, the coordinate information and the first time limit information, and outputs the first sub-image and the coordinate information to the selection unit 55, but outputs the first time limit information to a comparison unit 53. A second sub-image decoding unit 51 decodes the second sub-image, the coordinate information and the second time limit information, and outputs the second sub-image and the coordinate information to the selection unit 55, but outputs the second time limit information to the comparison unit 53.

The comparison unit 53 obtains the broadcast time from the main image decoding unit 45, obtains the first time limit information from the first sub-image decoding unit 49, obtains the second time limit information from the second sub-image decoding unit 51, and furthermore obtains the time at which the user of the reconstruction device views the data (referred to as "current time" in the following). Moreover, it compares the current time with the broadcast time, the first time limit information and the second time limit information, and outputs the result of this comparison to the selection unit 55.

The selection unit 55 receives the comparison result from the comparison unit 53, and, depending on the comparison result, outputs the partial image, the first sub-image or the second sub-image and the coordinate information to the image overlay unit 57. That is to say, if the current time is within the valid period indicated by the first time limit information, then it outputs the first sub-image to the image overlay unit 57, and if the current time is within the valid period indicated by the second time limit information, then it outputs the second sub-image to the image overlay unit 57. Moreover, if the current time is not the same as the broadcast time of the main image and the current time is not within the first time limit information or the second time limit information, then the selection unit 55 outputs the partial image to the image overlay unit 57. Furthermore, if the current time is the same as the broadcast time of the main image, then the selection unit 55 does not output any of the first sub-image, the second sub-image or the partial image to the image overlay unit 57.

The image overlay unit 57 receives the coordinate information as well as either the partial image, the first sub-image or the second sub-image from the selection unit 55, and receives the main image from the main image decoding unit 45. If the current time is the same as the broadcast time, then the image overlay unit 57 reconstructs the main image. On the other hand, if the current time is within the valid period indicated by the first time limit information, then the image overlay unit 57 overlays an image by overlaying the first sub-image over the main image (referred to as "first overlaid image" in the following) and outputs this first overlaid image. Moreover, if the current time is within the valid period indicated by the second time limit information, then the image overlay unit 57 overlays an image by overlaying the second sub-image over the main image (referred to as "second overlaid image" in the following) and outputs this second overlaid image. Furthermore, if the current time is not the broadcast time, and is not within the expiry dates indicated by the first and second time limit information, then the image overlay unit 57 overlays an image by overlaying the partial image over the main image (referred to as "partial overlaid image" in the following) and outputs this partial overlaid image. That is to say, if the current time is different from the broadcast time of the main image, then the portion of the main image over which the first overlay data is overlaid is output as an image that is covered by the first sub-image, the second sub-image or the partial image.

For example, let us assume that, the first overlay data is "Live Broadcast", the second overlay data is "Today's News" and the third overlay data is "This Week's News", and that the first time limit information is at least one minute up to one day, and the second time limit information is one day up to seven days, as noted above. In this case, if the current time is the broadcast time, the reconstruction device reconstructs the main image over which the character string "Live Broadcast" is overlaid. If the current time is one minute up to one day from the time of the broadcast, then the reconstruction device reconstructs the first overlaid image over which the character string "Today's News" is overlaid and if the current time is one day up to seven days from the time of the broadcast, then the reconstruction device reconstructs the second overlaid image over which the character string "This Week's News" is overlaid. If the current time does not correspond to any of these, then the partial overlaid image is reconstructed.

It should be noted that if the multiplexing unit 37 generates the transmitted data by multiplexing the broadcast time of the main image and the coordinate information, as indicated by the dotted lines in FIG. 3, then the separation unit 43 inputs the coordinate information and the broadcast time into various functional portions, as indicated by the dotted lines in FIG. 5. That is to say, the separation unit 43 separates the transmitted data from the transmitting device into the main image, the broadcast time of the main image, the partial image, the first sub-image, the first time limit information, the second sub-image, the second time limit information and the coordinate information, and outputs these. Thus, the comparison unit 53 obtains the broadcast time of the main image from the separation unit 43, and the image overlay unit 57 obtains the coordinate information from the separation unit 43.

(4) Operational Effect

As noted above, the transmitting device generates transmitted data including not only a main image, but also a first sub-image and a second sub-image. Then, based on a result of comparing the current time, the broadcast time of the main image, the first time limit information of the first sub-image and the second time limit information of the second sub-image, the reconstruction device reconstructs an image in accordance with the current time. Thus, the user can view the broadcast without being bothered by information that has become stale because a long time has passed after the broadcast. Moreover, the switching between the first overlay data and the second overlay data is performed automatically by the reconstruction device, so that the user can focus on the video and the audio corresponding to the current time, without performing an operation for viewing in accordance with the current time.

(5) Specific Example

In the foregoing, the main image, the partial image, the first sub-image and the second sub-image are encoded by separate encoders, and then multiplexed by the multiplexing unit 37. However, it is also possible to generate transmitted data by writing the partial image, the first sub-image and the second sub-image into a region belonging to the main image, into which any data can be written. That is to say, the corresponding partial image, first sub-image and second sub-image are buried in a suitable region included in the bit string of the main image. In the following, an example is explained in which this suitable region belonging to the main image is the user data region of the ISO/IEC13818-2 standard. In the following, a specific example is explained in which the partial image, the first sub-image and the second sub-image corresponding to the main image are converted into the user data format prescribed by the ISO/IEC13818-2 standard, and the main image as well as the images converted into the user data format are buried in this user data region.

As noted above, the multiplexing unit 37 of the transmitting device generates an elementary stream by placing the encoded data of the main image outside the user data region of the elementary stream, and inserting the broadcast time of the main image; the coordinate information and the partial image; the coordinate information, the first time limit information and the first sub-image; and the coordinate information, the second time limit information and the second sub-image into the user data region of the elementary stream. Then, the multiplexing unit 37 generates a transport stream by partitioning the generated elementary stream into variable-length packets of a PES (packetized elementary stream) and adding headers.

(5-1) The User Data Region of Each Layer

Figure 6:
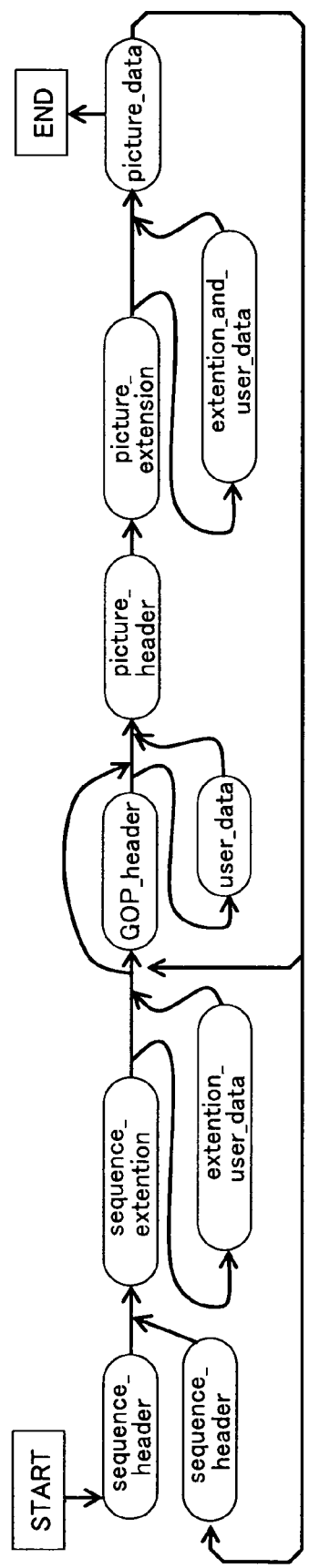
FIG. 6 is a diagram illustrating the syntax of ISO/IEC13818-2 (MPEG Video).

In particular under the ISO/IEC13818-2 standard, MPEG2 has a hierarchical structure including a sequence layer, a GOP (group of pictures) layer and a picture layer. Each layer has a user data region into which any data can be written. FIG. 6 is a diagram illustrating the syntax of ISO/IEC13818-2 (MPEG Video). The sequence layer is defined by a function including sequence_header, sequence_extension and extension_and_user_data. Sequence_header and sequence_extension define the header and the extension data of the sequence layer, whereas extension_and_user_data defines the extension data and the user data of the sequence layer. Moreover, the GOP layer is defined by a function including GOP_header and user_data. GOP_header defines the header of the GOP layer, and user_data defines the user data of the GOP layer. Moreover, the picture layer is defined by a function including picture_header, picture_extension, extension_and_user_data and picture_data. Picture_header and picture_extension define the header and the extension data of the picture layer, whereas extension_and_user_data defines the extension data and the user data of the picture layer. Moreover, picture_data is a function defining a slice layer and a macroblock layer. That is to say, it is possible to write any data with the extension_and_user_data and user_data of each layer. Thus, other than the main image, the multiplexing unit 37 of the transmitting device writes the broadcast time of the main image; the coordinate information and the partial image; the coordinate information, the first time limit information and the first sub-image; the coordinate information, the second time limit information and the second sub-image into extension_and_user_data and user_data. Based on what is written into extension_and_user_data and user_data, the reconstruction device reconstructs the main image and the partial image, the first sub-image or the second sub-image.

As shown in FIG. 6, it is not necessarily required to define the function extension_and_user_data of the sequence layer, and it is possible to advance to GOP_header after sequence_extension. Moreover, also GOP_header and user_data of the GOP layer do not necessarily have to be defined, and it is possible to advance to picture_header after sequence_extension. Similarly, the function extension_and_user_data of the picture layer does not necessarily have to be defined, and it is possible to advance to picture_data after picture_extension. If all functions shown in FIG. 6 are defined, then the procedure advances in the order sequence_header→sequence_extension→extension_and_user_data→GOP_header→user_data→picture_header→picture_extension→extension_and_user_data→picture_data.

(5-2) Sequence

Next, the extension_and_user_data and user_data shown in FIG. 6 is explained with reference to FIGS. 7 to 11. FIG. 7 is a diagram illustrating extension_and_user_data. For example, extension_and_user_data(0) is a function of the sequence layer, extension_and_user_data(1) is a function of the GOP layer, and extension_and_user_data(2) is a function of the picture layer. As for extension_and_user_data(i) in FIG. 7, if i is not 1, then a definition by extension_and_user_data is not performed, and only user_data is written. That is to say, only user_data is written in the GOP layer.

FIG. 8 is a diagram illustrating user_data. user_data_start_code indicates the start of a user data region into which any data can be written. Moreover, FIG. 8 shows that user_data is executed until "0000 0000 0000 0000 0000 0001" appears in the bit string of the elementary stream.

Figure 9:
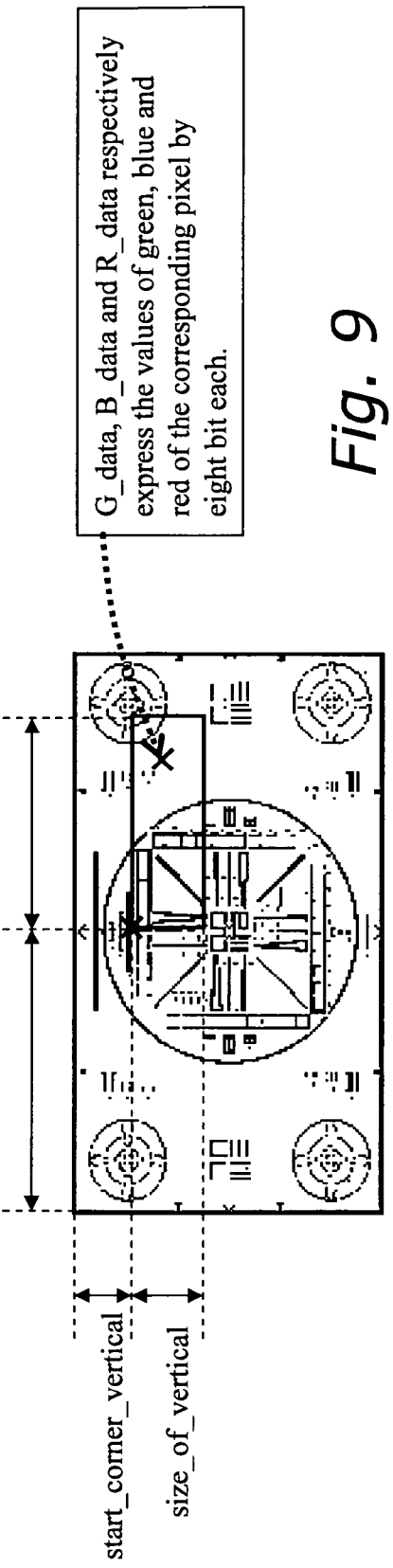
FIG. 9 shows a content example (1) of user_data.

FIG. 9 shows a Content Example (1) of user_data. The starting point at which the first sub-image, the second sub-image or the partial image starts is given by start_corner_horizontal and start_corner_vertical, whereas the size of the image is given by size_of_horizontal and size_of_vertical. Also, as expressed by the line "for (i=0; i<size_of_horizontal * size_of_vertical; i++) {", a loop is repeated for the number of dots obtained by multiplying size_of_horizontal and size_of_vertical, and each image is expressed by the GBR data of each dot. With the user_data shown in FIG. 9, the image overlay unit 57 of the reconstruction device can overlay the first sub-image, the second sub-image or the partial image defined by the GBR data at the coordinates given by start_corner_horizontal, start_corner_vertical, size_of_horizontal and size_of_vertical of the main image.

FIG. 10 is a Content Example (2) of user_data. The user_data in FIG. 10 is further provided with a PTS (presentation time stamp) defined by ISO/IEC13818-1. For example, PTS[32 . . . 30] denotes the "year", PTS[29 . . . 15] denotes the "day" and PTS[14 . . . 0] denotes the "hour/minute". It should be noted that "marker bit" indicates the partitioning of the bits of PTS, and is always written as "1", for example. Here, the broadcast time of the main image is expressed by PTS, as shown in FIG. 10, and also for the first sub-image, the second sub-image and the partial image, the same PTS as for the corresponding main image is given. Thus, it is possible to associate the pictures of the main image with the pictures of the first sub-image, the second sub-image or the partial image. Hence, the image overlay unit 57 of the reconstruction device can overlay the main image picture by picture with the first sub-image, the second sub-image and the partial image.

FIG. 11 is a Content Example (3) of user_data. In FIGS. 9 and 10, only one image overlaid over the main image was given, but in FIG. 11, a plurality of images overlaid over the main image and their corresponding time limit information is given. The first sub-image to be overlaid over the main image is given by the content starting from "time_frame_1_start", whereas the second sub-image to be overlaid over the main image is given by the content starting from "time_frame_2_start". For example, "time_frame_1_start [23 . . . 0]" expresses the first time limit information indicating the period during which the first sub-image can be reconstructed. "time_frame_1_start [23 . . . 11]" expresses the calendar year with 13 bits, "time_frame_1_start [9 . . . 6]" expresses the month with 4 bits and "time_frame_1_start [4 . . . 0]" expresses the day with 5 bits. It should be noted that "time_frame_1_start [10]" and "time_frame_1_start [5]" denote partitions of the time limit information expressed by 24 bits, and are always written as "1", for example. Similarly, "time_frame_2_start [23 . . . 0]" expresses the second time limit information indicating the period during which the second sub-image can be reconstructed.

If the current time is within the first time limit information expressed by "time_frame_1_start" and "time_frame_1_end", then the selection unit 55 of the reconstruction device outputs the first sub-image to the image overlay unit 57. If, on the other hand, the current time is within the second time limit information expressed by "time_frame_2_start" and "time_frame_2_end", then the selection unit 55 outputs the second sub-image to the image overlay unit 57. Also, if the current time is not identical with the broadcast time of the main image expressed by PTS, and the current time is neither within the first time limit information nor within the second time limit information, then the selection unit 55 outputs the partial image, which has no time limit information, to the image overlay unit 57. Furthermore, if the current time is identical with the broadcast time of the main image expressed by PTS, then the selection unit 55 does not output any of the first sub-image, the second sub-image or the partial image to the image overlay unit 57. The image overlay unit 57 receives the main image from the main image decoding unit 45, regardless of the current time. Thus, depending on the current time, the image overlay unit 57 reconstructs only the main image, or reconstructs the main image overlaid with the first sub-image, the second sub-image or the partial image output from the selection unit 55.

In this manner, the transmitting portion buries for example a partial image corresponding to the main image, a first sub-image, a second sub-image and the broadcast time of the main image in a user data region according to the ISO/IEC13818-2 standard. Thus, it is possible to generate an elementary stream to which the corresponding information is attached to each picture of the main image, that is, to each frame. Moreover, when the main image is selected with the reconstruction device, it is possible to obtain also the first sub-image corresponding to this main image at the same time. Thus, if the main image is edited, it is possible to prevent that the first sub-image is lost, for example by editing the main image and the first sub-image individually.

It should be noted that in the content examples given above are merely examples and there is no limitation to them.

SECOND WORKING EXAMPLE

In the first working example, the transmitted data is generated by multiplexing the encoded data of the sub-images or the partial image. By contrast, in the second working example, the transmitting device generates the transmitted data by storing the sub-images in a data storage unit 65 of a database on the WWW (world wide web), and multiplexing the addresses where they are stored. Moreover, the reconstruction device obtains the sub-images by accessing the addresses where they are stored and outputs those images.

The following is an explanation of a system for broadcasts with hidden subtitles according to a second working example. The system for broadcasts with hidden subtitles according to this second working example includes the transmitting device shown in FIG. 12 and the reconstruction device shown in FIG. 13.

(1) Functional Configuration of Transmitting Device

Figure 12:
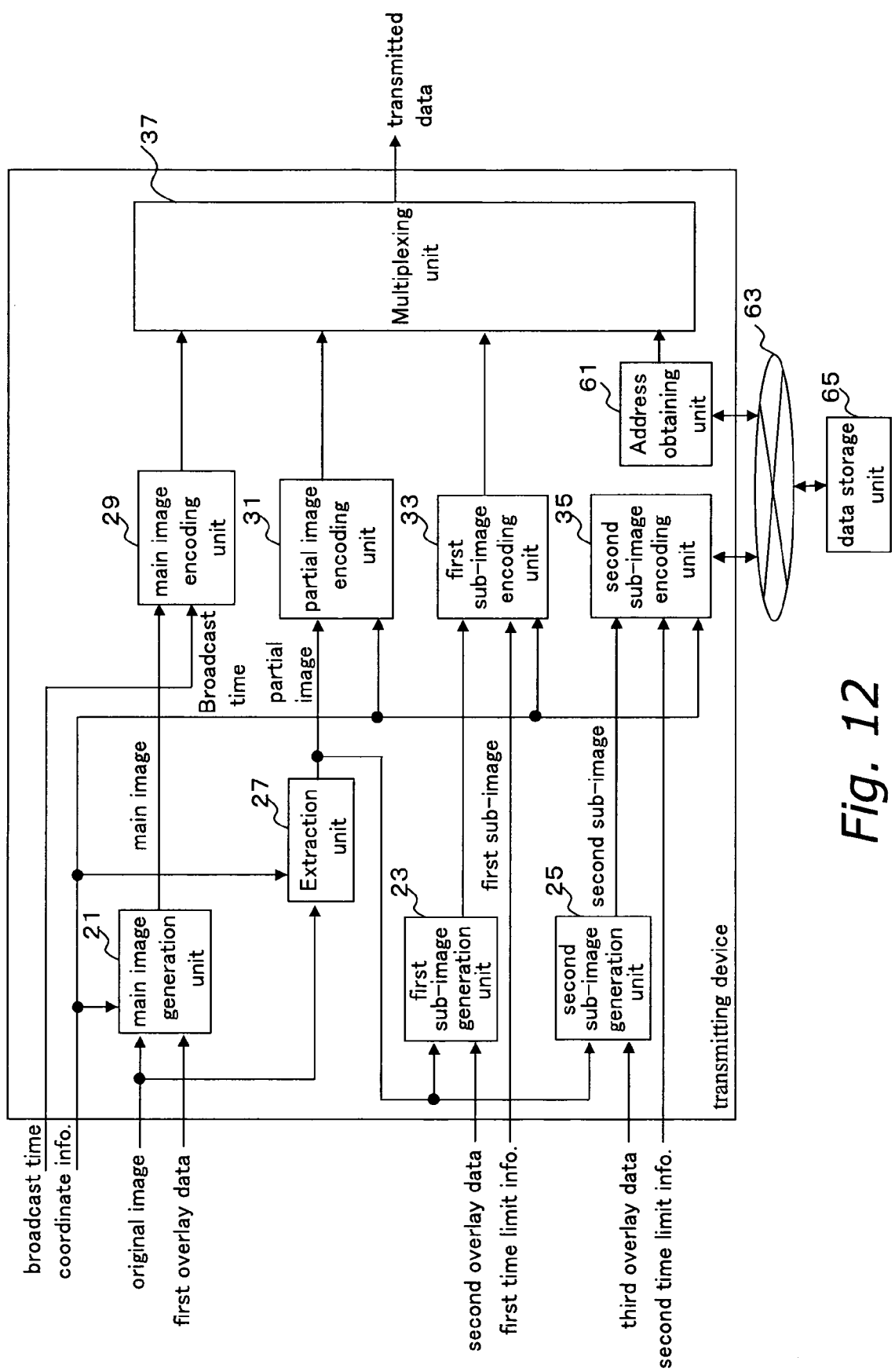
FIG. 12 is a block diagram showing the functional configuration of a transmitting device according to the present invention.

FIG. 12 is a block diagram showing the functional configuration of a transmitting device according to the present invention. The second sub-image encoding unit 35 of the transmitting device in FIG. 12 transmits encoded data over a network 63 to a data storage unit 65. The encoded data is obtained by encoding the second sub-image obtained by overlaying the third overlay data over the partial images, as well as the second time limit information and the coordinate information. Then, the address obtaining unit 61 obtains the address where the second sub-image is stored from the data storage unit 65 and outputs this address to the multiplexing unit 37. The multiplexing unit 37 receives the decoded data of the main image and the broadcast time of the main image from the main image decoding unit 29, receives the decoded data of the coordinate information and the partial image from the partial image decoding unit 31, receives the decoded data of the coordinate information, the first time limit information and the first sub-image from the first sub-image decoding unit 33, and receives the address of the second sub-image from the address obtaining unit 61. Then, the multiplexing unit 37 multiplexes the received data after associating it with one another, thus generating the transmitted data. The remaining configuration is similar to that of the first working example, so that it is discussed only briefly below.

Based on the coordinate information, the extraction unit 27 extracts the partial image from the original image. The first sub-image generation unit 23 generates the first sub-image by overlaying the second overlay data over the partial image extracted by the extraction unit 27. Similarly, the second sub-image generation unit 25 generates the second sub-image by overlaying the third overlay data over the partial image. The main image encoding unit 29 associates the main image and the broadcast time of the main image and encodes them, and outputs them to a multiplexing unit 37. The partial image encoding unit 31 associates the partial image and the coordinate information and encodes them. The first sub-image encoding unit 33 associates the first sub-image, the coordinate information and first time limit information and encodes them. The second sub-image encoding unit 35 associates the second sub-image and the coordinate information second time limit information and encodes them.

(2) Functional Configuration of the Reconstruction Device

Figure 13:
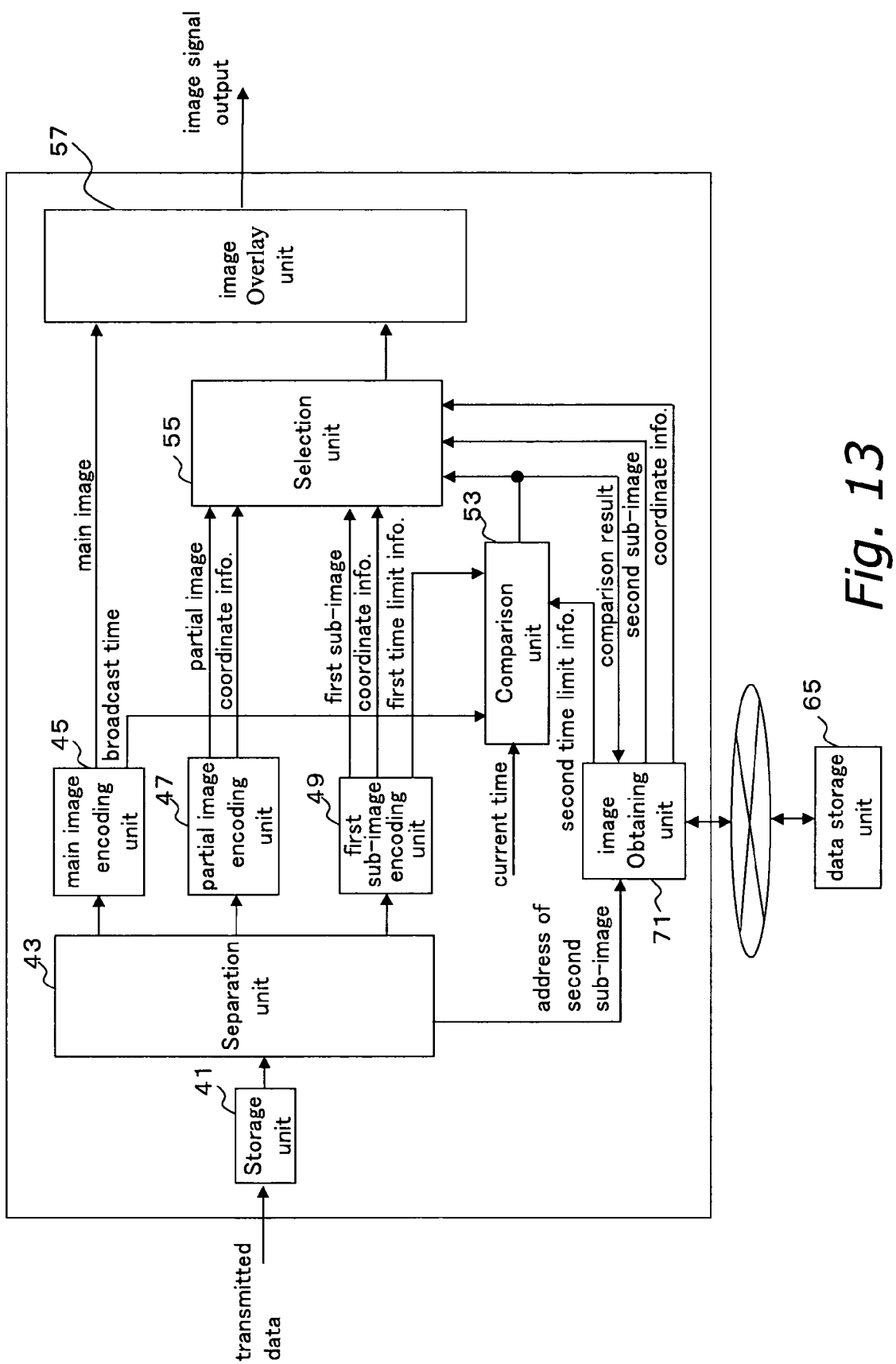
FIG. 13 is a block diagram showing the functional configuration of a reconstruction device according to the present invention.
Figure 14:
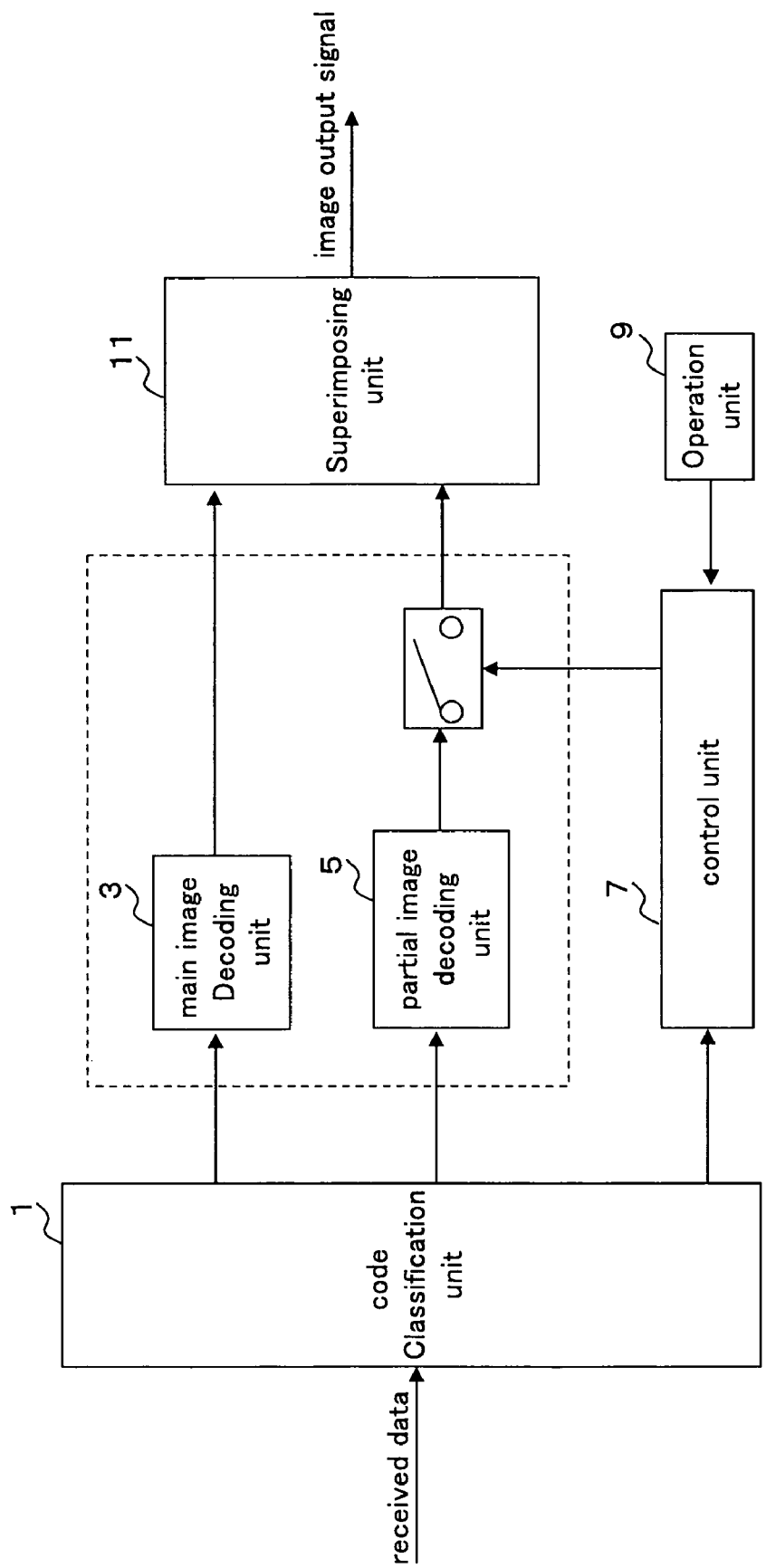
FIG. 14 is a diagram illustrating the conventional character hiding method described in JP 2000-41185A.

FIG. 13 is a block diagram showing the functional configuration of a reconstruction device according to the present invention. In the reconstruction device of FIG. 13, the separation unit 43 receives the transmitted data stored by the storage unit 41, and separates the transmitted data into the main image and its broadcast time; the partial image and the coordinate information; the first sub-image, the coordinate information and the first time limit information; and the address of the second sub-image. An image obtaining unit 71 receives the address of the second sub-image from the separation unit 43 and accesses the data storage unit 65 based on this address. Then, the image obtaining unit 71 obtains the second sub-image, the second time limit information and the coordinate information, and outputs first the second time limit information to the comparison unit 53.

The comparison unit 53 obtains the broadcast time from the main image decoding unit 45, obtains the first time limit information from the first sub-image decoding unit 49, obtains the second time limit information from the image obtaining unit 71, and furthermore obtains the time at which the user of the reconstruction device views the data (referred to as "current time" below). Then, the comparison unit 53 compares the current time with the broadcast time, the first time limit information and the second time limit information, and outputs the result of the comparison to the selection unit 55 and the image obtaining unit 71. If the image obtaining unit 71 receives the comparison result that the current time is within the second time limit information, then the obtained second sub-image and coordinate information are output to the selection unit 55. The remaining configuration is similar to that of the first working example, so that it is discussed only briefly below.

The main image decoding unit 45 receives and decodes the main image and its broadcast time, the partial image decoding unit 47 decodes the partial image and the coordinate information, and the first sub-image decoding unit 49 decodes the first sub-image, the coordinate information and the first time limit information. The decoded data is input into the comparison unit 53, the selection unit 55 and the image overlay unit 57. Based on the comparison result from the comparison unit 53, the selection unit 55 outputs either the partial image, the first-sub-image or the second sub-image and the coordinate information to the image overlay unit 57, or outputs none of these. In accordance with the current time, the image overlay unit 57 outputs the main image, the first overlaid image, the second overlaid image or the partial overlaid image.

The transmitting device and reconstruction device of this second working example have the same operational effect as the first working example.

It should be noted that it is also possible to store all sub-images and partial images in a data storage unit 65 on the WWW, and to multiplex only their addresses.

OTHER WORKING EXAMPLES (1)

In the foregoing working examples, a system for broadcasts with hidden subtitles was explained by way of an example in which a main image is overlaid with an image of a sub-image or the like. However, instead of overlaying images, it is also possible to overlay the audio belonging to the main image with audio belonging to the sub-image. For example, let us assume that the first overlay data overlaid over the original image is subtitles of earthquake information, and that the audio overlaid over the audio of the original image is an alarm sound for alerting to the earthquake information. Thus, the alarm sound is further overlaid over the main image over which the earthquake information is overlaid. Then, let us assume that the second overlay data over which the partial image is overlaid is a commercial, and that the audio attached to the partial image is the sound announcing the begin of the commercial. Thus, the sound announcing the beginning of the commercial is overlaid over the first sub-image, in which the commercial is overlaid over the partial image. When the reconstruction device receives transmitted data including such a main image and first sub-image, it first compares the current time with the broadcast time of the main image or the first time limit information of the first sub-image, as described above. Then, depending on the comparison result, the main image is output, or the main image is output with the first sub-image overlaid over it. In this situation, if the current time and the broadcast time are the same, then the reconstruction device outputs the main image, and also outputs an alarm sound together with the earthquake information. On the other hand, if the current time is within the first time limit information, then the first sub-image is overlaid over the main image, and the starting sound of the commercial is overlaid over the alarm sound of the main image, and output. Thus, the user of the reconstruction device can enjoy the broadcast without being bothered by a sound relating to information that has gone stale.

Using for example the ancillary region of the ISO/IEC 13818-3 standard for the audio of the sub-image, it is possible to write any desired data. Also audio information can be written with the configuration as described above, so that further explanations have been omitted.

(2)

The scope of the present invention also encompasses a computer program for executing a method of communicating wirelessly with a wireless communication terminal on a computer, as well as a computer-readable recording medium on which such a program is stored. Here, examples of computer-readable recording media include flexible disks, hard-disks, CD-ROMs, MOs, DVDs, DVD-ROMs, DVD-RAMs, BDs (Blue-Ray Discs) and semiconductor memories.

The computer program is not limited to being recorded on a recording medium, and may also be communicated through an electric communications line, a wireless or a wired communications line, or a network 63, such as the Internet.

The broadcasting method and the reconstruction method of the present invention includes a function of automatically hiding or automatically updating subtitles, and is useful for the automatic control of the display of subtitles in broadcast reconstruction devices with incorporated storage systems, such as digital recorders. Furthermore, also in cases in which a broadcaster wishes to display campaign information for only a certain specified period of time, or in such cases in which a telephone number that was displayed by the subtitle is changed unexpectedly after the broadcast, the present invention ensures that the is display content is automatically updated to the newest content, without the viewer noticing anything.

This application claims priority to Japanese Patent Application No. 2004-293513. The entire disclosure of Japanese Patent Application No. 2004-293513 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A transmitting device comprising:
a main image generation unit operable to generating a main image by overlaying first overlay data over an original image;
an extraction unit operable to extracting, from the original image, a partial image thereof over which the first overlay data is overlaid;
a sub-image generation unit operable to generating a first sub-image by overlaying second overlay data over the partial image;
a transmitted data generation unit operable to generating transmitted data by associating the main image and the first sub-image, and associating the main image with a broadcast time of the main image.

2. The transmitting device according to claim 1,
wherein the sub-image generation unit further generates a second sub-image by overlaying third overlay data over the partial image; and
wherein the transmitted data generation unit generates the transmitted data by further associating the main image with the second sub-image, associating the first sub-image with first time limit information indicating a period during which the first sub-image can be reconstructed, and associating the second sub-image with second time limit information indicating a period during which the second sub-image can be reconstructed.

3. The transmitting device according to claim 1,
wherein the transmitted data generation unit generates the transmitted data by further associating the main image with the partial image.

4. The transmitting device according to claim 1,
wherein the transmitted data generation unit generates the transmitted data by further associating the first sub-image with coordinate information of the partial image in the original image.

5. The transmitting device according to claim 1,
wherein the transmitted data generation unit attaches a time stamp or a packet ID to the packets constituting the main image and the first sub-image, so that the main image and the first sub-image can be associated with each other.

6. The transmitting device according to claim 5,
wherein the time stamp or the packet ID is, respectively, a PTS (presentation time stamp) or a PID (packet identifier) in accordance with the ISO/IEC13818-1 standard.

7. The transmitting device according to claim 1,
wherein the transmitted data generation unit generates the transmitted data by writing the first sub-image corresponding to the main image into a region that belongs to the main image and into which any data can be written.

8. The transmitting device according to claim 7,
wherein the region belongs to the main image and into which any data can be written is a user data region according to the ISO/IEC13818-2 standard; and
wherein the transmitted data generation unit generates the transmitted data by converting the first sub-image into a user data format in accordance with the ISO/IEC13818-2 standard, and writing the first sub-image, which has been converted into the user data format, into the user data region belonging to the main image.

9. The transmitting device according to claim 8,
wherein the first sub-image, which has been converted into the user data format, is arranged in the user data region of a picture unit of the corresponding main image.

10. The transmitting device according to claim 1,
further comprising an address obtaining unit operable to obtaining an address on the WWW (world wide web) where a second sub-image obtained by overlaying third overlay data over the partial image is stored;
wherein the transmitted data generation unit generates transmitted data by further associating the main image with the address of the second sub-image and associating the first sub-image with first time limit information on a time limit during which the first sub-image can be reconstructed.

11. A transmitting device comprising:
a main image generation unit operable to generating a main image by overlaying first overlay data over an original image;
an address obtaining unit operable to obtaining an address on the WWW (world wide web) where a first sub-image obtained by overlaying second overlay data over a partial image corresponding to an overlay region with first overlay data extracted from the original image is stored;
a transmitted data generation unit operable to generating transmitted data by associating the main image with the address of the first sub-image and associating the main image with a broadcast time of the main image.

12. A reconstruction device that reconstructs transmitted data generated by associating a main image obtained by overlaying first overlay data over an original image, with a first sub-image obtained by overlaying second overlay data over a partial image that is extracted from the original image and over which the first overlay data is overlaid, and associating the main image and a broadcast time of the main image, the reconstruction device comprising:
a comparison unit operable to comparing a current time with the broadcast time of the main image; and
an output unit operable to outputting the main image or a first overlaid image obtained by overlaying the first sub-image over the main image, in accordance with a result of the comparison with the comparison unit.

13. The reconstruction device according to claim 12,
wherein the transmitted data is generated by associating the main image with a second sub-image obtained by overlaying third overlay data over the partial image, associating the first sub-image with first time limit information on a time limit during which the first sub-image can be reconstructed, and associating the second sub-image with second time limit information on a time limit during which the second sub-image can be reconstructed;
wherein the comparison mean compares the current time with the broadcast time, the first time limit information and the second time limit information; and
wherein the output unit outputs the main image, the first overlaid image, or a second overlaid image obtained by overlaying the second sub-image over the main image in accordance with the result of the comparison with the comparison unit.

14. The reconstruction device according to claim 12,
wherein the transmitted data is generated by further associating the main image with the partial image; and
wherein the output unit outputs the main image, the first overlaid image or a partial overlaid image obtained by overlaying the partial image over the main image, in accordance with the result of the comparison with the comparison unit.

15. The reconstruction device according to claim 12,
wherein the transmitted data is generated by associating the first sub-image with coordinate information of the partial image in the original image.

16. The reconstruction device according to claim 12,
wherein the transmitted data has a time stamp or a packet ID attached to the packets constituting the main image and the first sub-image, so that the main image and the first sub-image can be associated with each other.

17. The reconstruction device according to claim 16,
wherein the time stamp or the packet ID is, respectively, a PTS (presentation time stamp) or a PID (packet identifier) in accordance with the ISO/IEC13818-1 standard.

18. The reconstruction device according to claim 12,
wherein in the transmitted data, the first sub-image corresponding to the main image is arranged in a region that belongs to the main image and into which any data can be written.

19. The reconstruction device according to claim 18,
wherein the region belongs to the main image and into which any data can be written is a user data region according to the ISO/IEC13818-2 standard; and
wherein the transmitted data is generated by writing the first sub-image, which has been converted into a user data format in accordance with the ISO/IEC13818-2 standard, into the user data region belonging to the main image.

20. The reconstruction device according to claim 19,
wherein the first sub-image, which has been converted into the user data format, is arranged in the user data region of a picture unit of the corresponding main image.

21. The reconstruction device according to claim 12,
wherein the transmitted data is generated by associating the main image with an address on the WWW (world wide web) where a second sub-image obtained by overlaying third overlay data over the partial image is stored, and associating the first sub-image with first time limit information on a time limit during which the first sub-image can be reconstructed;
wherein the comparison unit compares the current time with the broadcast time, the first time limit information and the second time limit information;
further comprising an image obtaining unit operable to obtaining the first sub-image by accessing the address of the second sub-image based on the result of the comparison with the comparison unit; and
wherein the output unit outputs the main image or the first overlaid image obtained by overlaying the first sub-image obtained with the image obtaining unit over the main image.

22. A reconstruction device which reconstructs transmitted data generated by associating a main image obtained by overlaying first overlay data over an original image, with an address on the WWW (world wide web) where a first sub-image obtained by overlaying second overlay data over a partial image extracted from the original image and over which the first overlay data is overlaid is stored, and associating the main image and a broadcast time of the main image, the reconstruction device comprising:
a comparison unit operable to comparing a current time with the broadcast time of the main image;
an image obtaining unit operable to obtaining the first sub-image by accessing the address of the first sub-image based on the result of the comparison with the comparison unit; and
an output unit operable to outputting the main image or the first overlaid image obtained by overlaying the first sub-image obtained with the image obtaining unit over the main image, in accordance with a result of the comparison with the comparison unit.

23. A transmitting method comprising the steps of:
generating a main image by overlaying first overlay data over an original image;
extracting, from the original image, a partial image over which the first overlay data is overlaid;
generating a first sub-image by overlaying second overlay data over the partial image; and
generating transmitted data by associating the main image and the first sub-image, and associating the main image with a broadcast time of the main image.

24. A reconstruction method for reconstruction transmitted data generated by associating a main image obtained by overlaying first overlay data over an original image, with a first sub-image obtained by overlaying second overlay data over a partial image extracted from the original image and over which the first overlay data is overlaid, and associating the main image and a broadcast time of the main image, the reconstruction method comprising the steps of:

comparing a current time with the broadcast time of the main image; and
outputting the main image or a first overlaid image obtained by overlaying the first sub-image over the main image, in accordance with a result of the comparison in the comparison step.

* * * * *